US012103834B2

(12) United States Patent
Mita et al.

(10) Patent No.: US 12,103,834 B2
(45) Date of Patent: Oct. 1, 2024

(54) FORKLIFT AND STOWAGE POSITION DETECTING METHOD FOR FORKLIFT

(71) Applicant: KABUSHIKI KAISHA TOYOTA JIDOSHOKKI, Kariya (JP)

(72) Inventors: Tatsuya Mita, Kariya (JP); Yoshiki Kakita, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 242 days.

(21) Appl. No.: 17/891,537

(22) Filed: Aug. 19, 2022

(65) Prior Publication Data

US 2023/0068916 A1 Mar. 2, 2023

(30) Foreign Application Priority Data

Aug. 24, 2021 (JP) .................................. 2021-136423

(51) Int. Cl.
*B66F 9/075* (2006.01)
*B66F 9/06* (2006.01)
*G05D 1/00* (2006.01)
*G06V 10/44* (2022.01)
*G06V 10/762* (2022.01)
*G06V 20/56* (2022.01)

(52) U.S. Cl.
CPC ............ *B66F 9/0755* (2013.01); *B66F 9/063* (2013.01); *G05D 1/0248* (2013.01); *G06V 10/44* (2022.01); *G06V 10/762* (2022.01); *G06V 20/56* (2022.01)

(58) Field of Classification Search
None
See application file for complete search history.

(56) References Cited

U.S. PATENT DOCUMENTS

| 6,411,210 | B1* | 6/2002 | Sower | B66F 9/0755 |
| | | | | 340/686.2 |
| 8,220,169 | B2* | 7/2012 | Goddard | B66F 9/0755 |
| | | | | 33/286 |
| 8,718,372 | B2* | 5/2014 | Holeva | G06T 7/20 |
| | | | | 382/181 |
| 9,170,090 | B2* | 10/2015 | Hansen | G01B 11/026 |
| 9,715,232 | B1* | 7/2017 | Fischer | B66F 9/063 |

(Continued)

FOREIGN PATENT DOCUMENTS

| JP | 2012-016985 A | 1/2012 |
| JP | 2021-004113 A | 1/2021 |
| WO | 2020/181727 A1 | 9/2020 |

*Primary Examiner* — Jonathan M Dager
(74) *Attorney, Agent, or Firm* — Sughrue Mion, PLLC

(57) ABSTRACT

A forklift stows a cargo on a loading surface. The loading surface is an upper surface of a loading platform. The forklift includes an external sensor configured to detect a position of an object, and processing circuitry. The position of the object is represented by a point cloud that is a set of points. The processing circuitry is configured to extract points that represent the loading platform, extract, from the points that represent the loading platform, points that represent an edge of the loading platform, detect a straight line that represents the edge from the points representing the edge, extract points that represent an object mounted on the loading platform, and detect, as a stowage position on which the cargo will be stowed, a position that is separated from the mounted object by a prescribed distance in a direction in which the straight line extends.

6 Claims, 9 Drawing Sheets

(56) References Cited

U.S. PATENT DOCUMENTS

| | | | | |
|---|---|---|---|---|
| 9,932,213 | B2* | 4/2018 | Buchmann | B66F 9/146 |
| 10,017,322 | B2* | 7/2018 | High | B65G 1/0492 |
| 10,025,314 | B2* | 7/2018 | Houle | B60W 30/0956 |
| 10,138,101 | B2* | 11/2018 | Svensson | H04N 13/204 |
| 10,202,267 | B2* | 2/2019 | Weiss | B66F 9/0755 |
| 10,248,123 | B2* | 4/2019 | Ichinose | G05D 1/0225 |
| 10,936,183 | B2* | 3/2021 | Ochenas | H04L 12/40 |
| 11,305,786 | B2* | 4/2022 | Levasseur | G01S 7/4972 |
| 11,345,577 | B2* | 5/2022 | Holwell | G05D 1/0088 |
| 11,542,134 | B2* | 1/2023 | Nonogaki | B66F 9/148 |
| 11,643,312 | B2* | 5/2023 | Uchimura | B66F 9/0755 187/224 |
| 2007/0269299 | A1* | 11/2007 | Ross | G05D 1/024 414/347 |
| 2008/0011554 | A1* | 1/2008 | Broesel | B66F 9/0755 187/224 |
| 2008/0159841 | A1* | 7/2008 | Keller | B66F 9/24 414/718 |
| 2011/0218670 | A1* | 9/2011 | Bell | B66F 9/0755 700/214 |
| 2016/0090283 | A1* | 3/2016 | Svensson | B66F 9/14 701/50 |
| 2017/0015537 | A1* | 1/2017 | Bosworth, III | B66F 9/07 |
| 2018/0105406 | A1* | 4/2018 | Goto | B66F 9/0755 |
| 2018/0134531 | A1* | 5/2018 | Tanaka | B66F 9/063 |
| 2018/0155169 | A1* | 6/2018 | Tanaka | G05D 1/0225 |
| 2019/0137991 | A1* | 5/2019 | Agarwal | G01C 21/383 |
| 2020/0102147 | A1* | 4/2020 | Sullivan | B65G 1/1375 |
| 2022/0189055 | A1* | 6/2022 | Kita | G06T 7/579 |
| 2022/0375206 | A1* | 11/2022 | Onoda | B66F 9/0755 |

\* cited by examiner

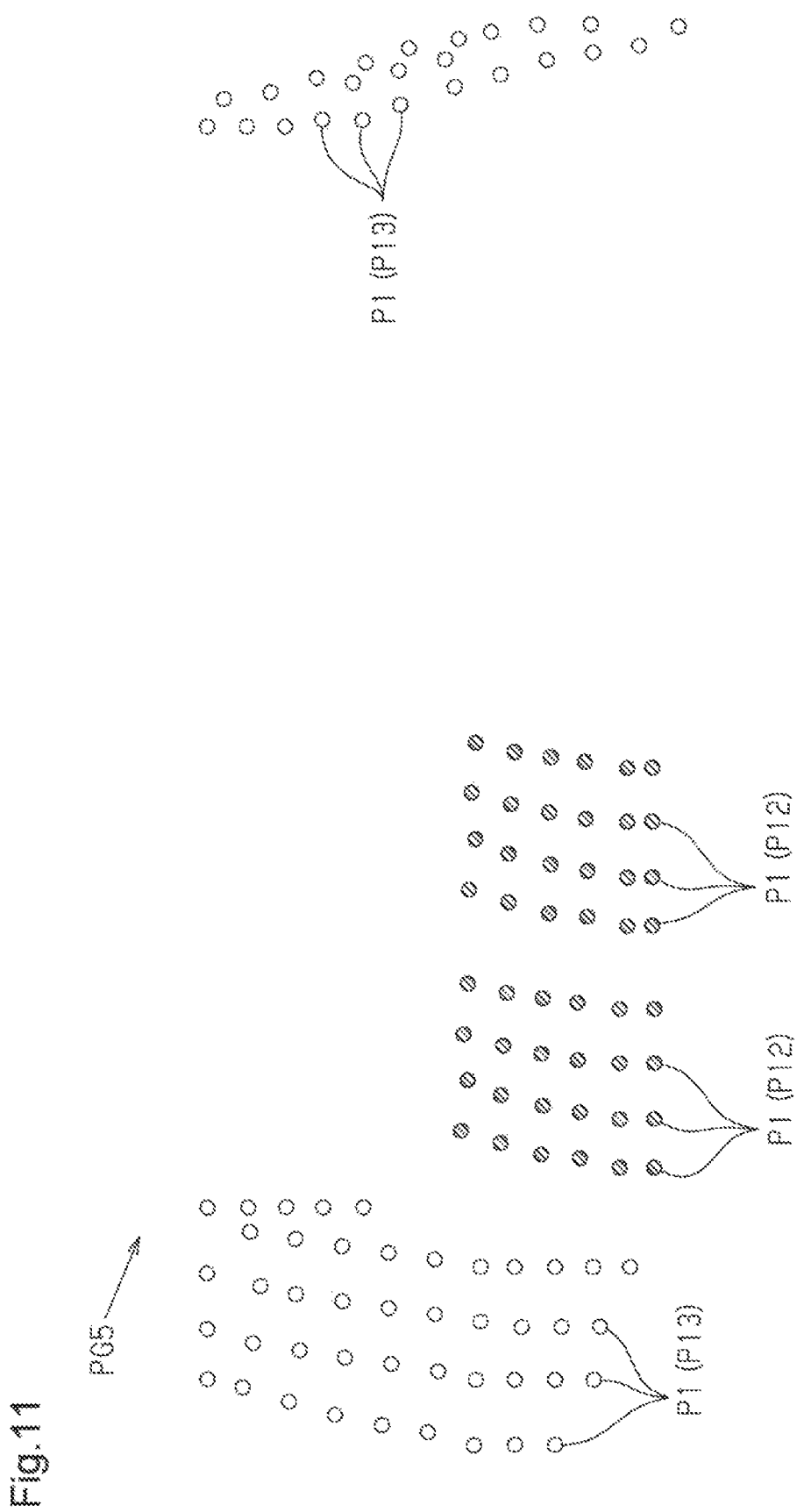

FORKLIFT AND STOWAGE POSITION DETECTING METHOD FOR FORKLIFT

BACKGROUND

1. Field

The present disclosure relates to a forklift and a stowage position detecting method for a forklift.

2. Description of Related Art

A forklift for stowing cargos on a loading platform carries a cargo mounted on the forks to a loading platform. The forklift then stows the cargo on a loading surface, which is an upper surface of the loading platform. Japanese Laid-Open Patent Publication No. 2021-4113 discloses a forklift that detects the height of a loading surface. This configuration allows the forks to be raised in correspondence with the height of the loading surface, so that a cargo mounted on the forks can be stowed on the loading surface.

The forklift of the above publication detects the height of a loading surface. There may be a case in which objects are already mounted on the loading surface. In such a case, a cargo mounted on the forks may not be stowed on the loading surface.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a forklift that stows a cargo on a loading surface is provided. The loading surface is an upper surface of a loading platform. The forklift includes an external sensor configured to detect a position of an object, and processing circuitry. The position of the object is represented by a point cloud that is a set of points expressed by coordinates in a three-dimensional coordinate system. The processing circuitry is configured to extract points that represent a horizontal plane from the point cloud, extract, as points that represent the loading platform, points within a specified range in an up-down direction from the horizontal plane, extract, from the points that represent the loading platform, points that represent an edge of the loading platform, the edge being in front of the forklift, detect a straight line that represents the edge from the points representing the edge, extract, as points that represent an object mounted on the loading platform, points that are above and separated from the horizontal plane by at least a specified distance, and detect, as a stowage position on which the cargo will be stowed, a position that is separated from the mounted object by a prescribed distance in a direction in which the straight line extends.

In another general aspect, a stowage position detecting method for a forklift is provided. The forklift stows a cargo on a loading surface. The loading surface is an upper surface of a loading platform. The method includes: detecting a position of an object using an external sensor provided in the forklift, the position of the object being represented by a point cloud that is a set of points expressed by coordinates in a three-dimensional coordinate system; extracting points that represent a horizontal plane from the point cloud; extracting, as points that represent the loading platform, points within a specified range in an up-down direction from the horizontal plane; extracting, from the points that represent the loading platform, points that represent an edge of the loading platform, the edge being in front of the forklift; detecting a straight line that represents the edge from the points that represent the edge; extracting, as points that represent an object mounted on the loading platform, points that are above and separated from the horizontal plane by at least a specified distance: and detecting, as a stowage position on which the cargo will be stowed, a position that is separated from the mounted object by a prescribed distance in a direction in which the straight line extends.

Other features and aspects will be apparent from the following detailed description, the drawings, and the claims.

BRIEF DESCRIPTION OF THE DRAWINGS

FIG. 11 is a diagram showing an example of a fifth point cloud obtained by the mounted object detection control shown in FIG. 5.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A forklift 20 according to one embodiment will now be described.

Figure 1:
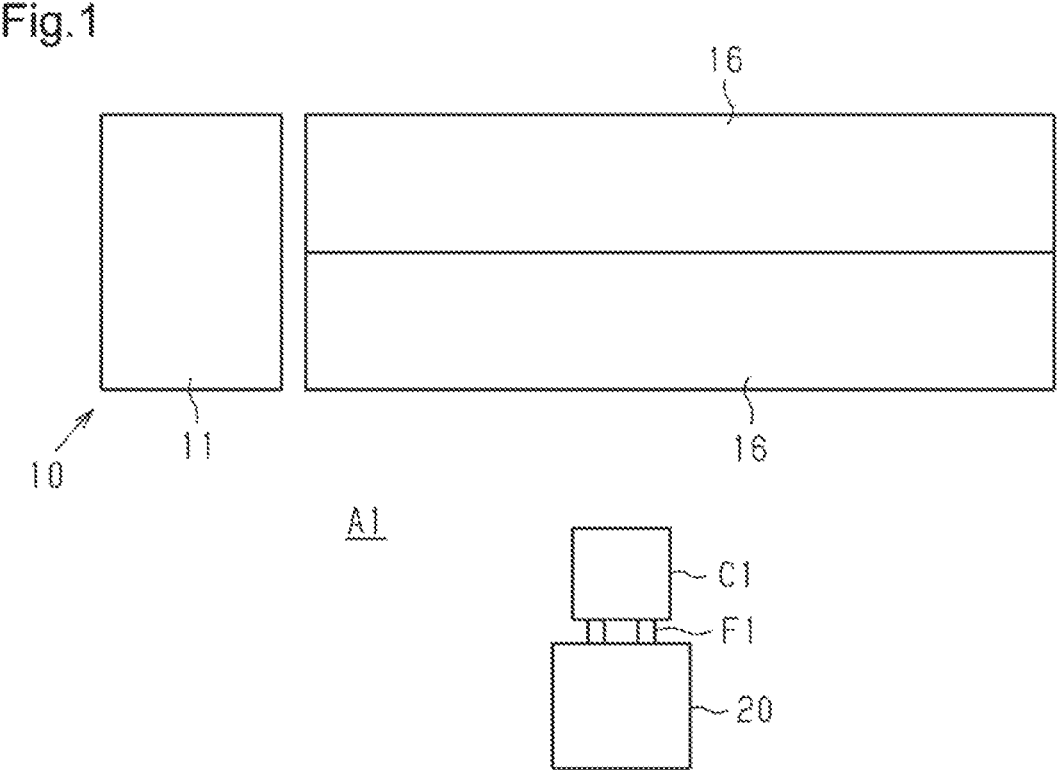
FIG. 1 is a diagram schematically showing a truck and a forklift.

As shown in FIG. 1, a truck 10 is parked in a zone A1. The truck 10 of the present embodiment is a wing truck. The forklift 20 is operated in the zone A1. The forklift 20 includes forks F1. A cargo C1 is mounted on the forks F1. The forklift 20 stows the cargo C1 mounted on the forks F1 on the truck 10.

Figure 2:
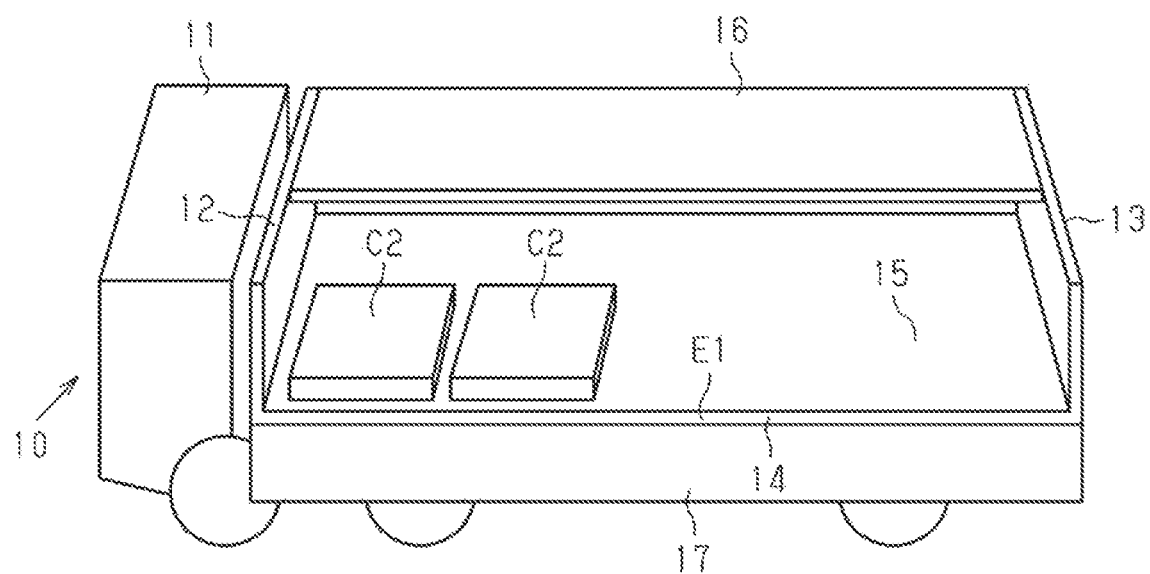
FIG. 2 is a perspective view of the truck shown in FIG. 1.

As shown in FIG. 2, the truck 10 includes a cabin 11, a front panel 12, a rear door 13, a loading platform 14, side panels 16, and gates 17.

A driver of the truck 10 boards the cabin 11. The front panel 12 is provided rearward of the cabin 11. The front panel 12 is adjacent to the cabin 11. The rear door 13 is provided rearward of the front panel 12. The front panel 12 and the rear door 13 are spaced apart from each other in a longitudinal direction. The loading platform 14 extends in the longitudinal direction between the front panel 12 and the rear door 13. The loading platform 14 includes a loading surface 15. The loading surface 15 is an upper surface of the loading platform 14. The cargo C1 is stowed on the loading surface 15. The side panels 16 are provided between the front panel 12 and the rear door 13. Each side panel 16 is provided to be vertically rotatable about the center in the width direction of the truck 10. The side panels 16 are each provided on one of the sides in the width direction of the truck 10. For illustrative purposes, one of the side panel 16 is omitted in FIG. 2. When a cargo is stowed in the truck 10, at least one of the side panels 16 is open. The gates 17 are provided to extend in the longitudinal direction. Each gate 17 is provided along an edge E1 of the loading platform 14. The edge E1 extends in the longitudinal direction. The gates 17 are each provided on one of the sides in the width direction of the truck 10.

Figure 3:
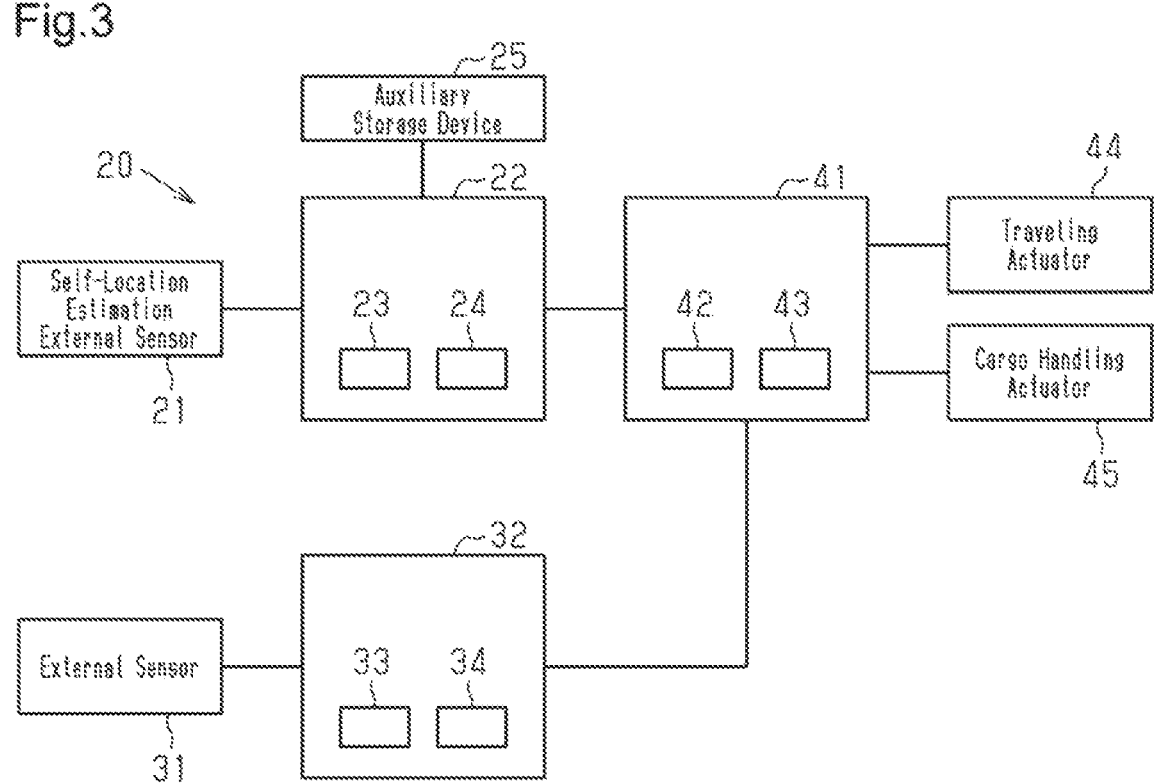
FIG. 3 is a schematic diagram of the forklift shown in FIG. 1.

As shown in FIG. 3, the forklift 20 includes a self-location estimation external sensor 21, a self-location estimation controller 22, an auxiliary storage device 25, an external sensor 31, a controller 32, a vehicle controller 41, a traveling actuator 44, and a cargo handling actuator 45.

The self-location estimation external sensor 21 allows the self-location estimation controller 22 to recognize three-dimensional coordinates of objects around the forklift 20. The self-location estimation external sensor 21 may include a millimeter wave radar, a stereo camera, a time-of-flight (ToF) camera, or a laser imaging, detection, and ranging (LIDAR) sensor. In the present embodiment, a LIDAR sensor is used as the self-location estimation external sensor 21. The self-location estimation external sensor 21 emits laser to the surroundings and receives reflected light from points irradiated with the laser, thereby deriving the distances to the respective points irradiated with the laser. The points irradiated with the laser are referred to as laser irradiated points and represent part of the surfaces of objects. The positions of the laser irradiated points can be expressed as coordinates in a polar coordinate system. The coordinates of the laser irradiated points in a polar coordinate system are converted into coordinates in a Cartesian coordinate system. Conversion from a polar coordinate system to a Cartesian coordinate system may be performed by the self-location estimation external sensor 21 or the self-location estimation controller 22. In the present embodiment, the self-location estimation external sensor 21 performs conversion from the polar coordinate system to the Cartesian coordinate system. The self-location estimation external sensor 21 derives coordinates of laser irradiated points in a self-location estimation sensor coordinate system. The self-location estimation sensor coordinate system is a three-axis Cartesian coordinate system of which the origin is the self-location estimation external sensor 21. The self-location estimation external sensor 21 outputs, to the self-location estimation controller 22, the coordinates of the laser irradiated points obtained through irradiation of laser. The coordinates are used as a point cloud.

The self-location estimation controller 22 includes a processor 23 and a storage unit 24. The storage unit 24 includes a random access memory (RAM), a read only memory (ROM), and a nonvolatile storage device that can be rewritten. The storage unit 24 stores program codes or commands configured to cause the processor 23 to perform processes. The storage unit 24, which is a computer-readable medium, includes any type of medium that is accessible by a general-purpose computer or a dedicated computer. The self-location estimation controller 22 may include a hardware circuit such as an ASIC and an FPGA. The self-location estimation controller 22, which is self-location estimation processing circuitry, may include one or more processors that operate according to a computer program, one or more hardware circuits such as an ASIC and an FPGA, or a combination thereof.

The auxiliary storage device 25 stores information that can be read by the self-location estimation controller 22. The auxiliary storage device 25 may be a hard disk drive or a solid state drive.

The auxiliary storage device 25 stores an environment map that represents the environment of the zone A1, in which the forklift 20 used. The environment map refers to information related to physical structure of the zone A1, such as the shapes of objects in the zone A1 and the size of the zone A1. In the present embodiment, the environment map is data that represents the structure of the zone A1 using coordinates in a map coordinate system. The map coordinate system is a three-axis Cartesian coordinate system. The map coordinate system is a coordinate system of which the origin is a given point in the zone A1. In the map coordinate system, horizontal directions are defined by an X-axis and a Y-axis, which are orthogonal to each other. An XY plane, which is defined by the X-axis and the Y-axis, represents a horizontal plane. An up-down direction in the map coordinate system is defined by a Z-axis, which is orthogonal to the X-axis and the Y-axis. A coordinate in the map coordinate system will be referred to as a map coordinate when appropriate. The map coordinate system is a three-dimensional coordinate system that is used to express three-dimensional positions.

The self-location estimation controller 22 estimates a self-location of the forklift 20. The self-location refers to the position of the forklift 20 on the environment map. The self-location refers to the coordinate of a point on the forklift 20 in the map coordinate system. The point on the forklift 20 may be chosen arbitrarily. The point may be the position of the center of the forklift 20 in the horizontal directions. The self-location estimation controller 22 executes a self-location estimation control.

The self-location estimation control executed by the self-location estimation controller 22 will now be described. The self-location estimation control is repeatedly executed at a specified control period.

Figure 4:
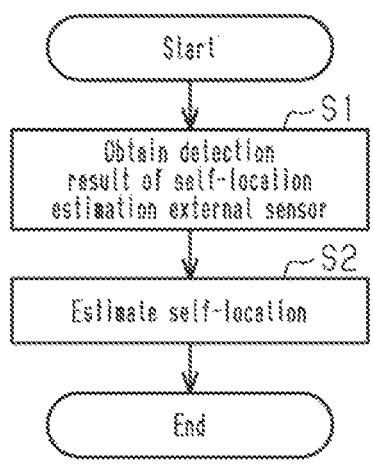
FIG. 4 is a flowchart showing a procedure of a self-location estimation control executed by the self-location estimation controller shown in FIG. 3.

As shown in FIG. 4, the self-location estimation controller 22 obtains a detection result from the self-location estimation external sensor 21 in step S1. This allows the self-location estimation controller 22 to obtain the shapes of the surroundings of the forklift 20 as a point cloud.

In step S2, the self-location estimation controller 22 compares the point cloud with the environment map to estimate the self-location. The self-location estimation controller 22 extracts landmarks from the environment map that have the same shapes as landmarks obtained from the point cloud. The self-location estimation controller 22 identifies the positions of the landmarks from the environment map. The positional relationship between the landmarks and the forklift 20 can be acquired from the detection result of the self-location estimation external sensor 21. Accordingly, the self-location estimation controller 22 is capable of estimating the self-location by identifying the positions of the landmarks. Landmarks are objects having characteristics that can be identified by the self-location estimation external sensor 21. Landmarks are physical structures of which the positions hardly change. Landmarks may include walls and pillars. After the process of step S2, the self-location estimation controller 22 ends the self-location estimation control.

The external sensor 31 allows the controller 32 to recognize three-dimensional coordinates of objects around the forklift 20. A sensor that is the same as the self-location estimation external sensor 21 may be used as the external sensor 31. In the present embodiment, a LIDAR sensor is used as the external sensor 31. The self-location estimation external sensor 21 and the external sensor 31 have different fields of view (FOV) in the vertical direction. The FOV in the vertical direction of the external sensor 31 is wider than the FOV in the vertical direction of the self-location estimation external sensor 21. That is, the external sensor 31 has a wider detection range in the up-down direction than the self-location estimation external sensor 21. The external sensor 31 derives coordinates of points in a sensor coordinate system. The sensor coordinate system is a three-axis Cartesian coordinate system of which the origin is the external sensor 31. In the sensor coordinate system, horizontal directions are defined by an X-axis and a Y-axis, which are orthogonal to each other. An XY plane, which is defined by the X-axis and the Y-axis, represents a horizontal plane. An up-down direction in the sensor coordinate system is defined by a Z-axis, which is orthogonal to the X-axis and the Y-axis. The sensor coordinate system is a three-dimensional coordinate system that is used to express three-dimensional positions. Coordinates of points in the sensor coordinate system represent positions of objects. The external sensor 31 outputs, to the controller 32, the coordinates of the points obtained through irradiation of laser. The coordinates are used as a point cloud. The points represent the positions of objects. The point cloud is a set of points that represent the positions of objects using three-dimensional coordinates.

The controller 32 is processing circuitry. The controller 32 includes, for example, the same hardware configuration as the self-location estimation controller 22. The controller 32 includes a processor 33 and a storage unit 34. The controller 32 detects a stowage position. The stowage position is on the loading surface 15 and is a position on which the cargo C1 on the forks F1 will be stowed.

The vehicle controller 41 includes, for example, the same hardware configuration as the self-location estimation controller 22. The vehicle controller 41 includes a processor 42 and a storage unit 43. The vehicle controller 41 is capable of obtaining the self-location estimated by the self-location estimation controller 22 and the stowage position detected by the controller 32. The vehicle controller 41 controls the traveling actuator 44 and the cargo handling actuator 45 based on the self-location and the stowage position.

The traveling actuator 44 causes the forklift 20 to travel. The traveling actuator 44 includes, for example, a motor that rotates driven wheels, and a steering mechanism. The vehicle controller 41 controls the traveling actuator 44 to cause the forklift 20 to travel, while acquiring the self-location. When stowing the cargo C1, the vehicle controller 41 causes the forklift 20 to move toward a stowage position, while acquiring the self-location.

The cargo handling actuator 45 causes the forklift 20 to perform cargo handling. The cargo handling actuator 45 includes, for example, a motor and a control valve. The motor drives a pump that supplies hydraulic fluid to a hydraulic machine, and the control valve controls the supply of the hydraulic fluid. The vehicle controller 41 controls the cargo handling actuator 45 to raise or lower the forks F1 and to tilt the forks F1. When stowing the cargo C1 on the stowage position, the forks F1 are raised or lowered, and tilted so that the cargo C1 is stowed on the stowage position.

The vehicle controller 41 controls the traveling actuator 44 so that the forklift 20 travels autonomously. The vehicle controller 41 controls the cargo handling actuator 45 so that the forklift 20 performs cargo handing autonomously. The forklift 20 is an autonomous forklift.

A stowage position detection control executed by the controller 32 will now be described. The stowage position detection control detects a stowage position. A case in which a stowage position on the truck 10 shown in FIG. 2 is detected will be described as an example. Objects C2 are already mounted on the loading platform 14 of the truck 10. The forklift 20 approaches the truck 10 based on a command from a host controller. When the distance between the forklift 20 and the truck 10 is less than a specified distance, the stowage position detection control is started. The specified distance is a distance at which the external sensor 31 can detect the truck 10.

Figure 5:
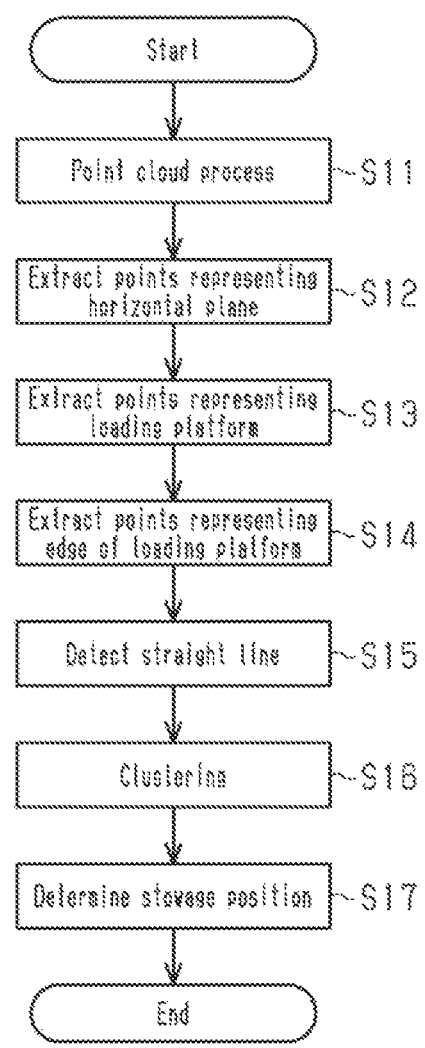
FIG. 5 is a flowchart showing a procedure of a stowage position detection control executed by the controller shown in FIG. 3.
Figure 6:
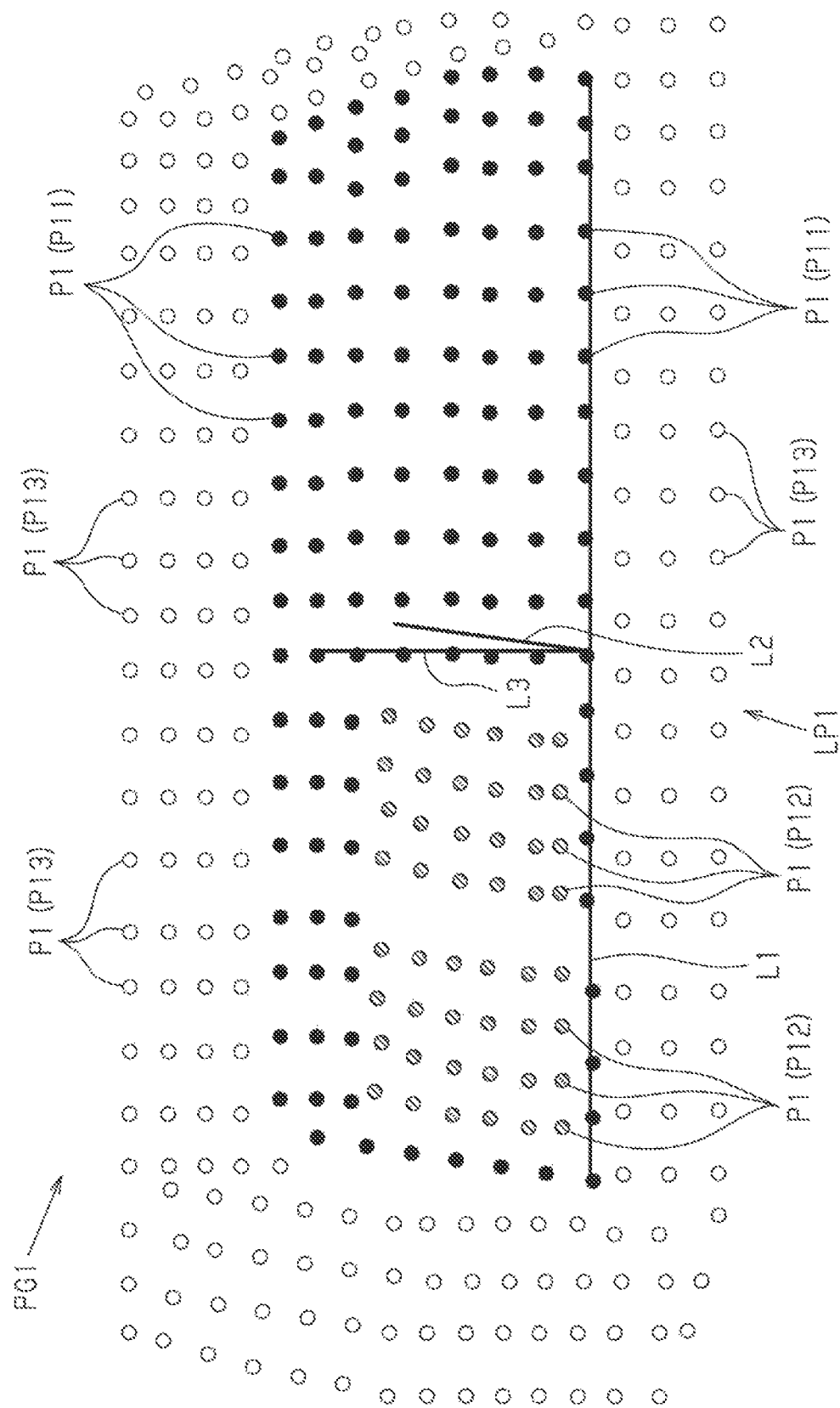
FIG. 6 is a diagram showing an example of a first point cloud obtained by the stowage position detection control shown in FIG. 5.

As shown in FIGS. 5 and 6, the controller 32 executes a point cloud process in step S11. The point cloud process is superposition of point clouds obtained from detection results of the external sensor 31. The controller 32 obtains point clouds from the external sensor 31 multiple times while the forklift 20 is traveling. Based on the self-location estimated by the self-location estimation controller 22, the controller 32 converts the coordinates of points P1 in the point cloud from coordinates in the sensor coordinate system into map coordinates. The controller 32 is capable of recognizing the coordinate of the origin of the sensor coordinate system in the map coordinate system based on the self-location estimated by the self-location estimation controller 22. The controller 32 is capable of recognizing deviations between the axes of the map coordinate system and the axes of the sensor coordinate system based on the self-location estimated by the self-location estimation controller 22. The controller 32 converts the coordinates of the points P1 in the point cloud from the coordinates in the sensor coordinate system into map coordinates based on the coordinate in the map coordinate system of the origin of the sensor coordinate system and the deviation between the axes of the map coordinate system and the axes of the sensor coordinate system. Each time obtaining a point cloud, the controller 32 superposes the points P1 converted into the map coordinates, thereby generating a first point cloud PG1. The first point cloud PG1 is a set of point clouds. Thus, the points P1 included in the first point cloud PG1 are denser than the points P1 included in a single point cloud.

FIG. 6 shows the first point cloud PG1, which is obtained by the process of step S11. The points P1 in the first point cloud PG1 represent map coordinates of objects. For illustrative purposes, the points P1 in the first point cloud PG1 are classified into first points P11, second points P12, and third points P13.

The first points P11 are the points P1 that have been obtained by irradiating the loading surface 15 of the loading platform 14 with a laser. The first points P11 represent the map coordinates of the loading surface 15 of the loading platform 14. For illustrative purposes, the first points P11 are depicted as filled circles.

The second points P12 are the points P1 that have been obtained by irradiating the mounted objects C2 placed on the loading surface 15 of the loading platform 14 with a laser. The second points P12 represent the map coordinates of the mounted objects C2 placed on the loading surface 15 of the loading platform 14. For illustrative purposes, the second points P12 are depicted as circles with diagonal lines.

The third points P13 are the points P1 that correspond to neither the first points P11 nor the second points P12. For illustrative purposes, the third points P13 are depicted as blank circles.

Next, in step S12 as shown in FIG. 5, the controller 32 extracts points P1 that represent a horizontal plane from the first point cloud PG1. The controller 32 calculates normal vectors of the respective points P1. The normal vector of each P1 refers to a vector that is orthogonal to the tangent plane at the point P1. Methods of deriving normal vectors include a method that obtains a curved plane from multiple points P1 and derives normal vectors at the respective points P1, and a method that uses vector products. For example, when obtaining the normal vector of one point P1, the controller 32 obtains the product of vectors directed to two points P1 that are located in a specified range from the first point P1. The obtained vector product is a normal vector.

The controller 32 extracts points P1 of which the normal vectors are directed in the up-down direction. Specifically, the controller 32 determines whether the angle of each normal vector with respect to the XY-plane in the map coordinate system is within a predetermined range. If the points P1 represent a horizontal plane, the angle of the normal vector of each point P1 with respect to the XY-plane is 90°. In the present embodiment, the predetermined range is set based on various factors including the inclination of the loading platform 14, which varies depending on the parking position of the truck 10, and the accuracy of the external sensor 31. The range is, for example, 90°±a specified angle. The specified angle is, for example, 10°. That is, the range is between 80° and 100°, inclusive. The controller 32 extracts points P1 of which the angles of the normal vectors are within a predetermined range as points P1 of which the normal vectors are directed in the up-down direction. The extracted points P1 are points P1 that represent a horizontal plane.

Figure 7:
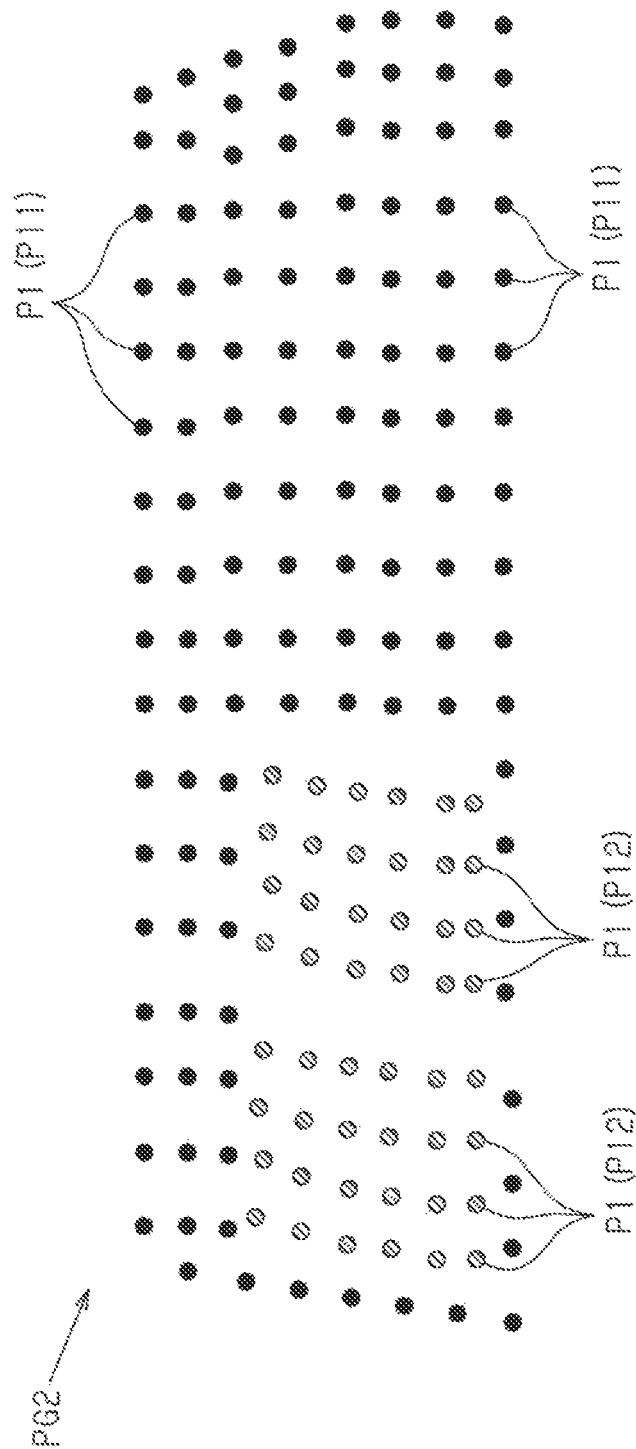
FIG. 7 is a diagram showing an example of a second point cloud obtained by the stowage position detection control shown in FIG. 5.

FIG. 7 shows a second point cloud PG2, which is obtained by the process of step S12. The points P1 that represent horizontal planes are extracted from the first point cloud PG1 and are used to form the second point cloud PG2. The second point cloud PG2 includes the first points P11 and the second points P12. That is, the points P1 that represent the loading surface 15 and the points P1 that represent a horizontal plane of each mounted object C2 are extracted from the first point cloud PG1.

Next, the controller 32 extracts the points P1 that represent the loading platform 14 in step S13 as shown in FIG. 5. The controller 32 derives a plane equation from the points P1 that represent the horizontal plane extracted in step S12. Based on the map coordinates (x, y, z) of the points P1 extracted in step S12, the controller 32 calculates values of a, b, c, and d that satisfy the equation $ax+by+cz+d=0$. The plane equation can be derived by using, for example, a robust estimation such as random sample consensus (RANSAC) or the least squares method. The plane expressed by the plane equation represents the horizontal plane. The controller 32 defines a plane expressed by the plane equation as the horizontal plane.

The controller 32 extracts, from the first point cloud PG1, points P1 within a specified range in the up-down direction from a horizontal plane expressed by the plane equation. The points P1 within the specified range in the up-down direction from the horizontal plane are points P1 that are located within the specified range with respect to opposite sides of the horizontal plane in the Z-axis of the map coordinate system. These points P1 represent the loading platform 14, specifically, the loading surface 15 of the loading platform 14. The specified range is set to exclude, for example, the mounted objects C2, which are mounted on the loading surface 15, from the first point cloud PG1.

Figure 8:
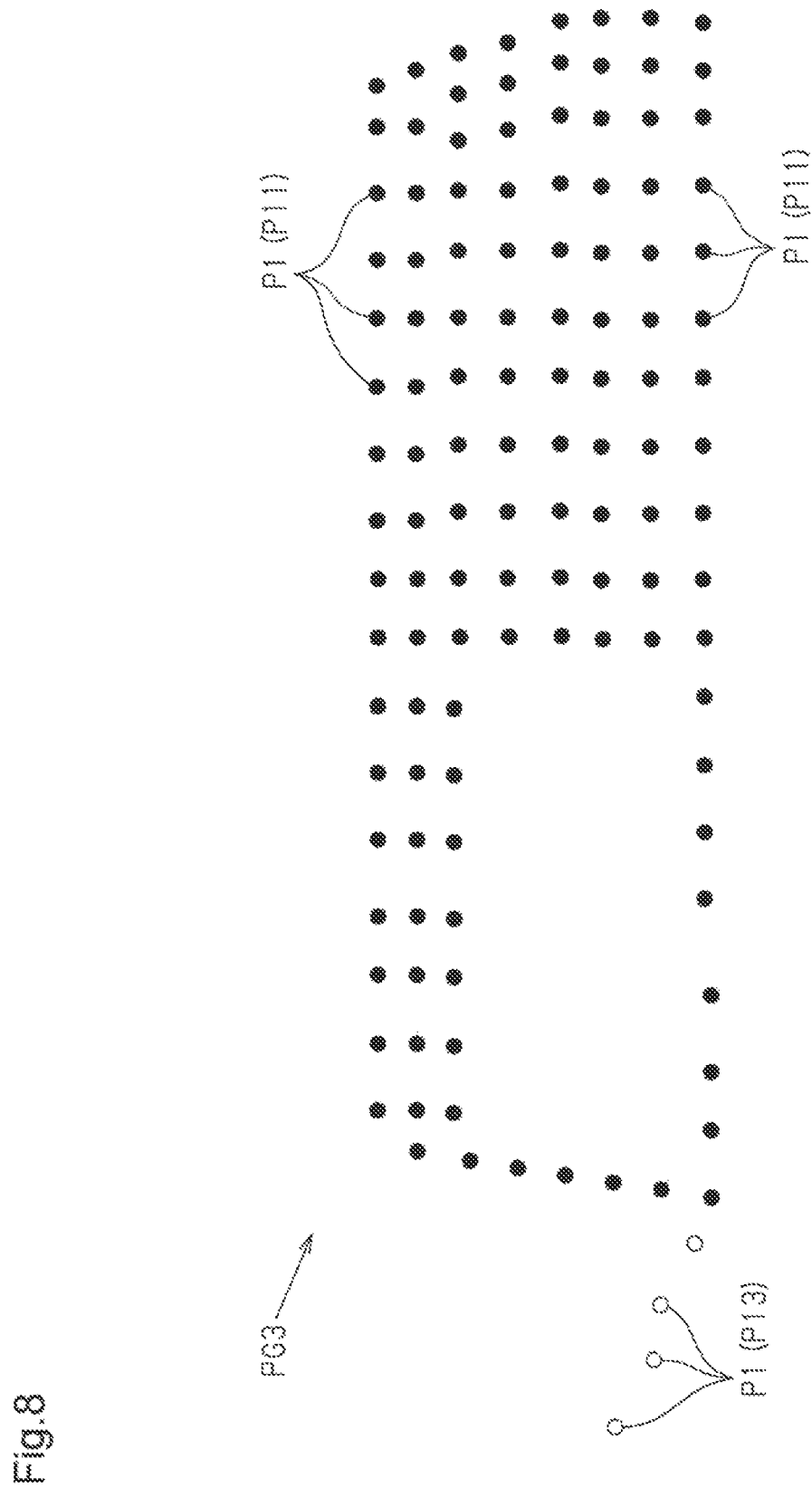
FIG. 8 is a diagram showing an example of a third point cloud obtained by the stowage position detection control shown in FIG. 5.

FIG. 8 shows a third point cloud PG3, which is obtained by the process of step S13. The points P1 that are within a specified range in the up-down direction from the horizontal plane expressed by the plane equation are extracted from the first point cloud PG1 and are used to form the third point cloud PG3. The third point cloud PG3 includes, in addition to the first points P11, the third points P13 that have been obtained by irradiating the cabin 11 with a laser.

As shown in FIG. 5, the controller 32 next extracts the points P1 that represent the edge E1 of the loading platform 14, which is located in front of the forklift 20, in step S14. The edge E1 is located in front of the forklift 20. The cargo C1 passes above the edge E1 when the forklift 20 stows the cargo C1. The controller 32 converts the orthogonal coordinates of the points P1 in the third point cloud PG3 into polar coordinates in the polar coordinate system. A polar coordinate is expressed by a radial coordinate r and two angular coordinates θ, φ. The radial coordinate r refers to a distance from the origin of the polar coordinate system. The angular coordinate θ refers to an angular coordinate in the horizontal plane. The angular coordinate θ is an angle with respect to the X-axis in the XY-plane in the map coordinate system. The angular coordinate φ refers to an angular coordinate in a vertical plane. The angular coordinate φ is an angle with respect to the Z-axis in the map coordinate system. In the present embodiment, the origin of the polar coordinate system is the self-location. The controller 32 divides the polar coordinate system into angular sections of a specified angle within the horizontal plane, and extracts, from each angular section, the point P1 of which the coordinate is closest to the self-location. The specified angle is set in accordance with, for example, the angular resolution of the external sensor 31. If two or more points P1 are included in a specified angular section, the controller 32 extracts one of the points P1 that has the shortest radial coordinate r. The extracted points P1 represent the edge E1 of the loading platform 14.

Figure 9:
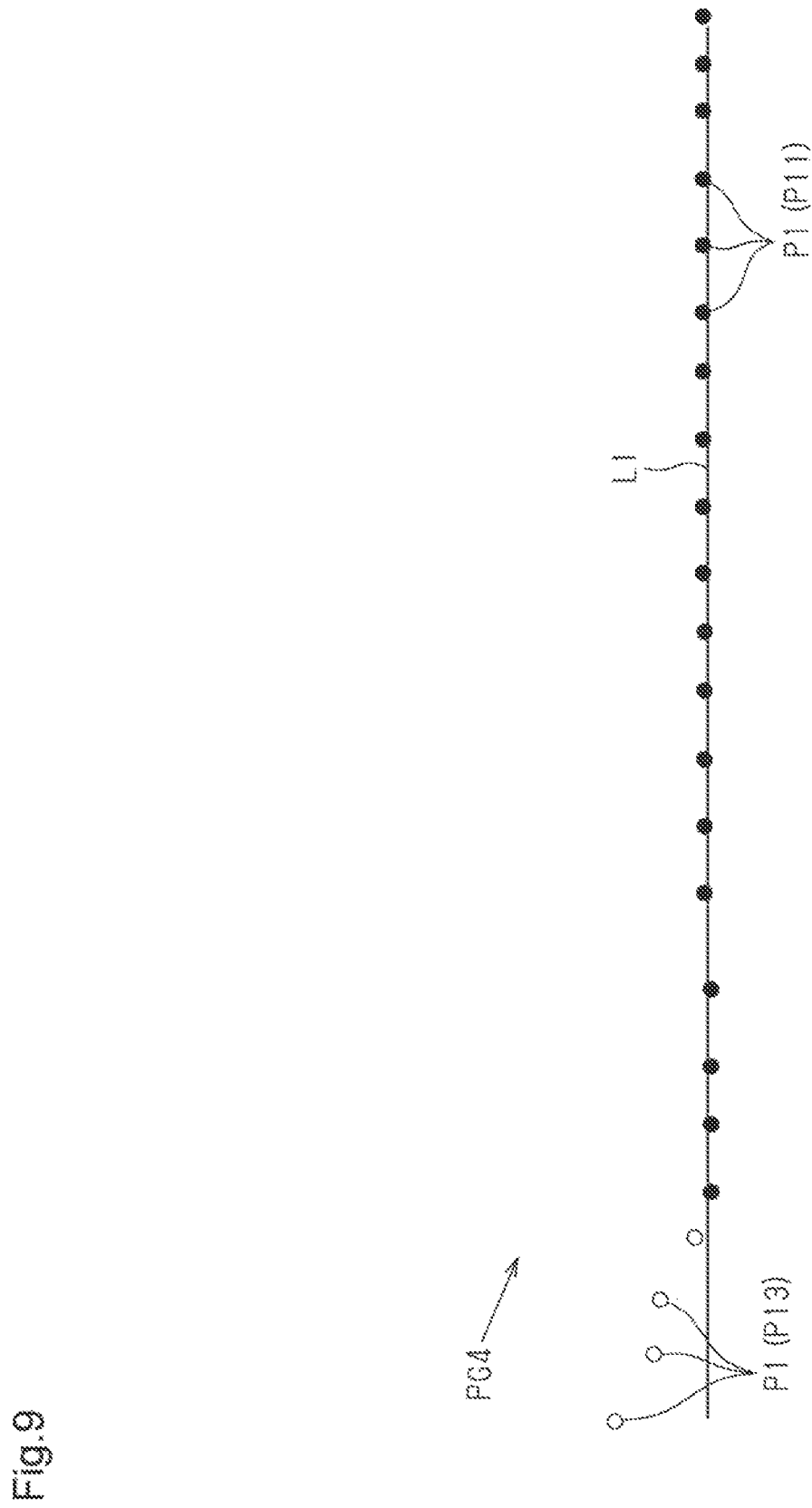
FIG. 9 is a diagram showing an example of a fourth point cloud obtained by the stowage position detection control shown in FIG. 5.

FIG. 9 shows a fourth point cloud PG4, which is obtained by the process of step S14. The points P1 that represent the edge E1 of the loading platform 14 in front of the forklift 20 are extracted from the third point cloud PG3 and are used to form the fourth point cloud PG4. The fourth point cloud PG4 includes, in addition to the first points P11, the third points P13 that have been obtained by irradiating the cabin 11 with a laser. That is, the process of step S14 may not be able to extract solely the points P1 that represent the edge E1 of the loading platform 14.

As shown in FIG. 5, the controller 32 performs straight line detection in step S15. The controller 32 returns the coordinates of the points P1, that have been converted into polar coordinates, to map coordinates in step S14. The controller 32 then detects a straight line from the map coordinates of the points P1 obtained in step S14. In the present embodiment, the controller 32 detects the straight line using RANSAC. The controller 32 may detect the straight line using another method such as the least squares method. The straight line represents the edge E1 of the loading platform 14. FIG. 9 shows a straight line L1, which is detected in step S15.

Next, the controller 32 performs clustering in step S16. The clustering is performed on the points P1 that represent the edge E1 of the loading platform 14. That is, the clustering is performed on the fourth point cloud PG4. The clustering refers to a process that groups points P1 that are assumed to represent a single object into a single cluster. The controller 32 groups, into one cluster, points P1 of which the distances between them are within a specified range. The controller 32 extracts, from the fourth point cloud PG4, the points P1 that represent the edge E1 of the loading platform 14. In other words, the controller 32 removes, from the fourth point cloud PG4, the points P1 other than the points P1 that represent the edge E1 of the loading platform 14. In the present embodiment, the points P1 that represent the cabin 11 are removed from the fourth point cloud PG4. For example, the controller 32 extracts, from the fourth point cloud PG4, the points P1 that belong to the largest one of the clusters obtained through the clustering. This limits the range in which the straight line L1, which has been detected in step S15, to the range of the edge E1 of the loading platform 14. That is, the straight line L1, which has been detected in step S15, can be now regarded as the edge E1 of the loading platform 14.

The controller 32 determines the stowage position in step S17. The stowage position is separated, by a prescribed distance, from the mounted objects C2 in the direction in which the straight line L1, which has been detected in step S15, extends. The controller 32 detects the stowage position based on the straight line L1 and the points P1 that are extracted by a mounted object detection control, which will be described below. First, the mounted object detection control will be described, and step S17 will be described thereafter.

Figure 10:
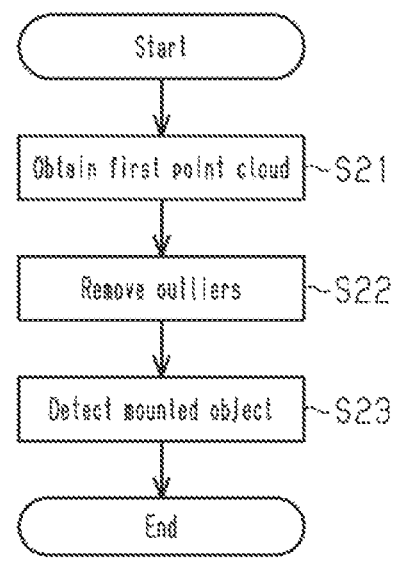
FIG. 10 is a flowchart showing a procedure of a mounted object detection control shown in FIG. 5.

As shown in FIG. 10, in step S21, the controller 32 obtains the first point cloud PG1, which has been obtained by the stowage position detection control. That is, the controller 32 obtains the first point cloud PG1, which has been obtained by the point cloud process of step S11.

Next, the controller 32 removes outliers from the first point cloud PG1 in step S22. The outlier removal may be performed by using an outlier removal filter or robust estimation.

Next, in step S23, the controller 32 detects the mounted objects C2 placed on the loading surface 15. The controller 32 detects the mounted objects C2 from the first point cloud PG1, from which outliers have been removed, and the plane equation that has been derived in step S13. The controller 32 extracts, from the first point cloud PG1, the points P1 that are above and separated, by distances greater than or equal to a specified distance, from the horizontal plane expressed by the plane equation. The specified distance is set to exclude, for example, the points P1 that represent the loading platform 14 from the first point cloud PG1. This allows the points P1 that represent the mounted objects C2 to be extracted since the mounted objects C2 are on the loading platform 14.

FIG. 11 shows a fifth point cloud PG5, which is obtained by the process of step S23. The fifth point cloud PG5 includes the third points P13, which represent objects other than the mounted objects C2, in addition to the second points P12, which represent the mounted objects C2. After obtaining the fifth point cloud PG5, the controller 32 ends the mounted object detection control.

Step S17 of the stowage position detection control, which is shown in FIG. 5, will be described. The controller 32 detects the stowage position from the straight line L1 and the fifth point cloud PG5. The controller 32 sets the stowage position to a position located on a straight line that orthogonally intersects the straight line L1, and is separated from the second points P12 in the fifth point cloud PG5 by a prescribed distance in a direction in which the straight line L1 extends. In the present embodiment, the stowage position is set to a position that is separated, by the prescribed distance in the direction in which the straight line L1 extends, from an edge of the mounted objects C2 represented by the second points P12. When the mounted objects C2 are arranged from the front panel 12 toward the rear door 13 as shown in FIG. 2, the stowage position is set to a position that is separated by the prescribed distance from the edge closest to the rear door 13 of the mounted object C2 closest to the rear door 13. The cargo C1 is stowed to the stowage position such that the center of the cargo C1 agrees with the center of the stowage position. The prescribed distance is determined such that the cargo C1 does not interfere with the mounted objects C2 in this state. If the dimensions of the cargo C1 are known in advance, the prescribed distance may be a predetermined fixed value. For example, if the cargo C1 and the mounted objects C2 are pallets of the same shape, the prescribed distance may be the value obtained by an expression: pallet width/2+a specified value. The specified value may be set to any value. In this case, clearance between the cargo C1 and the mounted object C2 is the specified value. The center of the cargo C1 refers to the center of the cargo C1 in the direction in which the straight line L1 extends.

When the dimensions of the cargo C1 are unknown, the dimensions of the cargo C1 may be measured, and the prescribed distance may be determined based on the measured dimensions. The dimensions of the cargo C1 can be measured, for example, using a sensor provided in the forklift 20. The sensor may be the self-location estimation external sensor 21 or the external sensor 31. Although the fifth point cloud PG5 includes the third points P13, the third points P13 are not located on a straight line that orthogonally intersects the straight line L1. Therefore, even if the fifth point cloud PG5 includes the third points P13, the stowage position can be detected.

FIG. 6 shows an example of a stowage position LP1. The present embodiment includes straight lines that orthogonally intersect the straight line L1. These straight lines include a straight line L2, which orthogonally intersects the straight line L1 and extends in a horizontal direction, and a straight line L3, which orthogonally intersects the straight line L1 and extends in a vertical direction. The controller 32 detects, as the stowage position LP1, a position on the straight line L2 and/or a position on the straight line L3. The stowage position LP1 may include a position that is above the loading surface 15 and is passed through by the cargo C1 when the cargo C1 is moved to be ultimately mounted on a position on the loading surface 15. The stowage position LP1 is detected as a map coordinate. The controller 32 may detect one of the straight line L2 and the straight line L3. After ending the process of step S17, the controller 32 ends the stowage position detection control. If the mounted objects C2 are not detected, the stowage position LP1 may be set to a position that is separated from the end of the straight line L1 by the prescribed distance.

Operation of the present embodiment will now be described.

The loading surface 15 expands in horizontal directions. When the points P1 that represent a horizontal plane are extracted from a point cloud in step S12, the extracted points P1 include the points P1 that have been obtained through reception of laser light reflected by the loading surface 15. When a plane equation is derived from the extracted points P1, the plane equation that expresses the horizontal plane is obtained. The controller 32 extracts the points P1 within the specified range in the up-down direction from the horizontal plane. This allows the points P1 that represent the loading platform 14 to be extracted. That is, the second points P12 that represent the mounted objects C2 can be removed. The points P1 that represent the loading platform 14 include the points P1 that represent the edge E1, which is located in front of the forklift 20. The forklift 20 approaches the edge E1 when performing stowage. That is, the edge E1 extends along the stowage position. The controller 32 detects the position of the edge E1 as the straight line L1. The points P1 that are above and separated from the horizontal plane by at least the specified distance represent the mounted objects C2 on the loading platform 14. The controller 32 detects the stowage position from the straight line L1 and the mounted objects C2.

The present embodiment has the following advantages.

(1) The controller 32 detects, as the stowage position, a position that is separated, by at least the prescribed distance, from the mounted objects C2 in the direction in which the straight line L1 extends. The stowage position is on the loading platform 14 and separated from the mounted objects C2. Thus, the controller 32 detects, as the stowage position, a position at which the mounted objects C2 on the loading surface 15 are unlikely to interfere with the cargo C1 on the forks F1.

(2) The controller 32 derives the normal vectors of the respective points P1. The controller 32 extracts the points P1 of which the normal vectors are in the up-down direction, and derives the plane equation from the extracted points P1. The normal vectors refer to vectors that are each orthogonal to the tangent plane at the corresponding point P1. Accordingly, the points P1 that represent the horizontal plane can be extracted by deriving the normal vectors of the respective points P1 and extracting the points P1 of which the normal vectors are in the up-down direction. It is thus possible to assume that the plane expressed by the plane equation is a horizontal plane.

(3) The controller 32 performs clustering by grouping the points P1 that are assumed to represent a single object. This removes the points P1 that represent objects other than the loading platform 14.

(4) The forklift 20 includes the self-location estimation external sensor 21 and the external sensor 31, which is different from the self-location estimation external sensor 21. Unlike a case in which the self-location estimation external sensor 21 is used to detect the stowage position, the stowage position can be detected using the external sensor 31, which is suitable for detecting the stowage position. For example, since the embodiment uses the external sensor 31, which has a wider FOV than the self-location estimation external sensor 21, the loading surface 15 is likely to be included in the FOV even if the forklift 20 is close to the truck 10. Thus, the stowage position is easily detected as compared to a case in which the stowage position is detected by the self-location estimation external sensor 21.

(5) The controller 32 detects the edge E1 of the loading platform 14, and detects, as the stowage position, a position that does not interfere with the mounted objects C2 on the loading surface 15. Even when the parking position and the orientation of the truck 10 are unknown, the stowage position can be detected if the external sensor 31 detects the edge E1 of the loading platform 14 and the mounted objects C2. This allows the forklift 20 to perform stowage even when the parking position and the orientation of the truck 10 are unknown.

The above-described embodiment may be modified as follows. The above-described embodiment and the following modifications can be combined as long as the combined modifications remain technically consistent with each other.

The self-location estimation external sensor 21 may be used as an external sensor that detects the stowage position. In this case, the self-location estimation external sensor 21 is also used as an external sensor that detects the stowage position.

The cargo C1 may be stowed in anything that includes a loading platform. For example, the cargo C1 may be stowed in a truck different from a wing truck, such as a flatbed truck, a shelf, or a shipping container.

The controller 32 may derive the stowage position in the sensor coordinate system and then convert the stowage position into map coordinates. That is, the controller 32 may derive the stowage position after converting a point cloud obtained from the external sensor 31 into the map coordinate system. Alternatively, the controller 32 may derive the stowage position without converting the point cloud into the map coordinate system. In these cases, the controller 32 can superpose different point clouds on each other if the controller 32 acquires the amount of travel of the forklift 20. The amount of travel may be obtained through the self-location estimation or dead reckoning.

The points P1 that represent the horizontal plane can be derived by any appropriate method. For example, the controller 32 may extract, as the points P1 that represent the horizontal plane, the points P1 at a height at which the greatest number of the points P1 are distributed.

The controller 32 does not necessarily need to perform clustering. In this case, the controller 32 may distinguish the points P1 that represent the edge E1 and the points P1 that represent objects other than the edge E1 by a method different from clustering. For example, a space exists above the points P1 that represent the edge E1. Thus, there is a region in which the points P do not exist above the points P1 that represent the edge E1. In contrast, the cabin 11 exists above the points P1 that represent the cabin 11. Thus, the controller 32 may refer to the coordinates on the Z-axis of the points P1 in the fourth point cloud PG4, so as to determine whether certain points P1 represent the edge E1 based on whether there are points P1 that are located above and superposed on the certain points P1.

The controller 32 may perform the clustering before performing the straight line detection.

The controller 32 may set the stowage position to a position that is separated, by a prescribed distance, from the center of the adjacent mounted object C2 in the direction in which the straight line L1 extends.

The controller 32 may convert the points P1 in point clouds into the map coordinates through matching with the environment map in step S11. The controller 32 then may superpose the point clouds, which have been converted into the map coordinates, on each other, thereby generating the first point cloud PG1. The matching with the environment map may be performed by using, for example, iterative closest point (ICP) or normal distributions transform (NDT).

If the points P1 in the point cloud obtained from the external sensor 31 are dense, the controller 32 may execute step S12 and the subsequent processes using the obtained point cloud. That is, the controller 32 does not necessarily need to superpose multiple point clouds on each other.

The forklift 20 may be a manually operated forklift. In this case, the controller 32 may show the stowage position on a display unit. The display unit is located in the view of an operator who is operating the forklift 20. Showing the stowage position on the display unit allows the operator to adjust the position of the forks F1 while monitoring the display unit. The operator may be aboard the forklift 20. The operator may operate the forklift 20 from a remote location.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A forklift that stows a cargo on a loading surface, the loading surface being an upper surface of a loading platform, the forklift comprising:
    an external sensor configured to detect a position of an object; and
    processing circuitry, wherein
    the position of the object is represented by a point cloud that is a set of points expressed by coordinates in a three-dimensional coordinate system, and
    the processing circuitry is configured to
        extract points that represent a horizontal plane from the point cloud,
        extract, as points that represent the loading platform, points within a specified range in an up-down direction from the horizontal plane,
        extract, from the points that represent the loading platform, points that represent an edge of the loading platform, the edge being in front of the forklift,
        detect a straight line that represents the edge from the points representing the edge,
        extract, as points that represent an object mounted on the loading platform, points that are above and separated from the horizontal plane by at least a specified distance, and
        detect, as a stowage position on which the cargo will be stowed, a position that is separated from the mounted object by a prescribed distance in a direction in which the straight line extends.

2. The forklift according to claim 1, wherein
the processing circuitry is configured to
    derive normal vectors of respective points in the point cloud,
    extracts points of which the normal vectors are in the up-down direction,
    derive a plane equation from the extracted points, and
    define a plane expressed by the plane equation as the horizontal plane.

3. The forklift according to claim 1, wherein the processing circuitry is configured to perform clustering on the points that represent the edge, the clustering being a process that groups points into one cluster.

4. The forklift according to claim 1, further comprising:
    a self-location estimation external sensor that is different from the external sensor; and
    self-location estimation processing circuitry configured to estimate a self-location of the forklift by using the self-location estimation external sensor.

5. The forklift according to claim 4, wherein
the processing circuitry is configured to
    convert orthogonal coordinates of the points that represent the loading platform into polar coordinates in a polar coordinate system,
    divides the polar coordinate system into angular sections of a specified angle within a horizontal plane, and
    extracts, from each angular section, a point of which the coordinate is closest to the self-location as the points that represent the edge.

6. A stowage position detecting method for a forklift, the forklift stowing a cargo on a loading surface, the loading surface being an upper surface of a loading platform, the method comprising:
    detecting a position of an object using an external sensor provided in the forklift, the position of the object being represented by a point cloud that is a set of points expressed by coordinates in a three-dimensional coordinate system;
    extracting points that represent a horizontal plane from the point cloud;
    extracting, as points that represent the loading platform, points within a specified range in an up-down direction from the horizontal plane;
    extracting, from the points that represent the loading platform, points that represent an edge of the loading platform, the edge being in front of the forklift;
    detecting a straight line that represents the edge from the points that represent the edge;
    extracting, as points that represent an object mounted on the loading platform, points that are above and separated from the horizontal plane by at least a specified distance: and
    detecting, as a stowage position on which the cargo will be stowed, a position that is separated from the mounted object by a prescribed distance in a direction in which the straight line extends.

* * * * *